United States Patent
Miyachi et al.

(10) Patent No.: US 8,608,067 B2
(45) Date of Patent: Dec. 17, 2013

(54) WEB SERVICE FOR ENABLING NETWORK ACCESS TO HARDWARE PERIPHERALS

(75) Inventors: Christine Miyachi, Andover, MA (US); Eric Lambert, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 324 days.

(21) Appl. No.: 12/753,267

(22) Filed: Apr. 2, 2010

(65) Prior Publication Data
US 2011/0240736 A1 Oct. 6, 2011

(51) Int. Cl.
*G06K 5/00* (2006.01)

(52) U.S. Cl.
USPC ......... 235/382; 235/379; 235/380; 235/382.5

(58) Field of Classification Search
USPC .............. 235/380, 382, 382.5, 375, 383, 379; 705/16
See application file for complete search history.

(56) References Cited

U.S. PATENT DOCUMENTS

| | | | |
|---|---|---|---|
| 7,942,337 B2* | 5/2011 | Jain | 235/492 |
| 2004/0230489 A1* | 11/2004 | Goldthwaite et al. | 705/26 |
| 2005/0218218 A1* | 10/2005 | Koster | 235/383 |
| 2006/0064373 A1* | 3/2006 | Kelley | 705/39 |
| 2006/0144927 A1* | 7/2006 | Love et al. | 235/380 |
| 2007/0174033 A1* | 7/2007 | Huang et al. | 703/24 |
| 2009/0072021 A1* | 3/2009 | Mateen et al. | 235/379 |
| 2009/0184164 A1* | 7/2009 | Sparks | 235/382 |
| 2011/0320257 A1* | 12/2011 | Mankoff | 705/14.35 |
| 2012/0078794 A1* | 3/2012 | Grandcolas et al. | 705/44 |

* cited by examiner

*Primary Examiner* — Tuyen K Vo

(57) ABSTRACT

The present specification discloses methods and systems to enable a peripheral device, which otherwise lacks intrinsic networking capabilities, to be accessible over a network once attached to a local multi-function device, such as computers, laptops, printers, copiers, or other computing devices. An enabling application executing on the multi-function device includes a first layer that communicates with the local peripheral device using a driver specific to the peripheral device, a second layer that abstracts a subset of functions from the first layer and exposes the subset of functions to a third layer, and the third layer which communicates over the network with a client and provides the client access to the subset of functions through standardized calls.

20 Claims, 12 Drawing Sheets

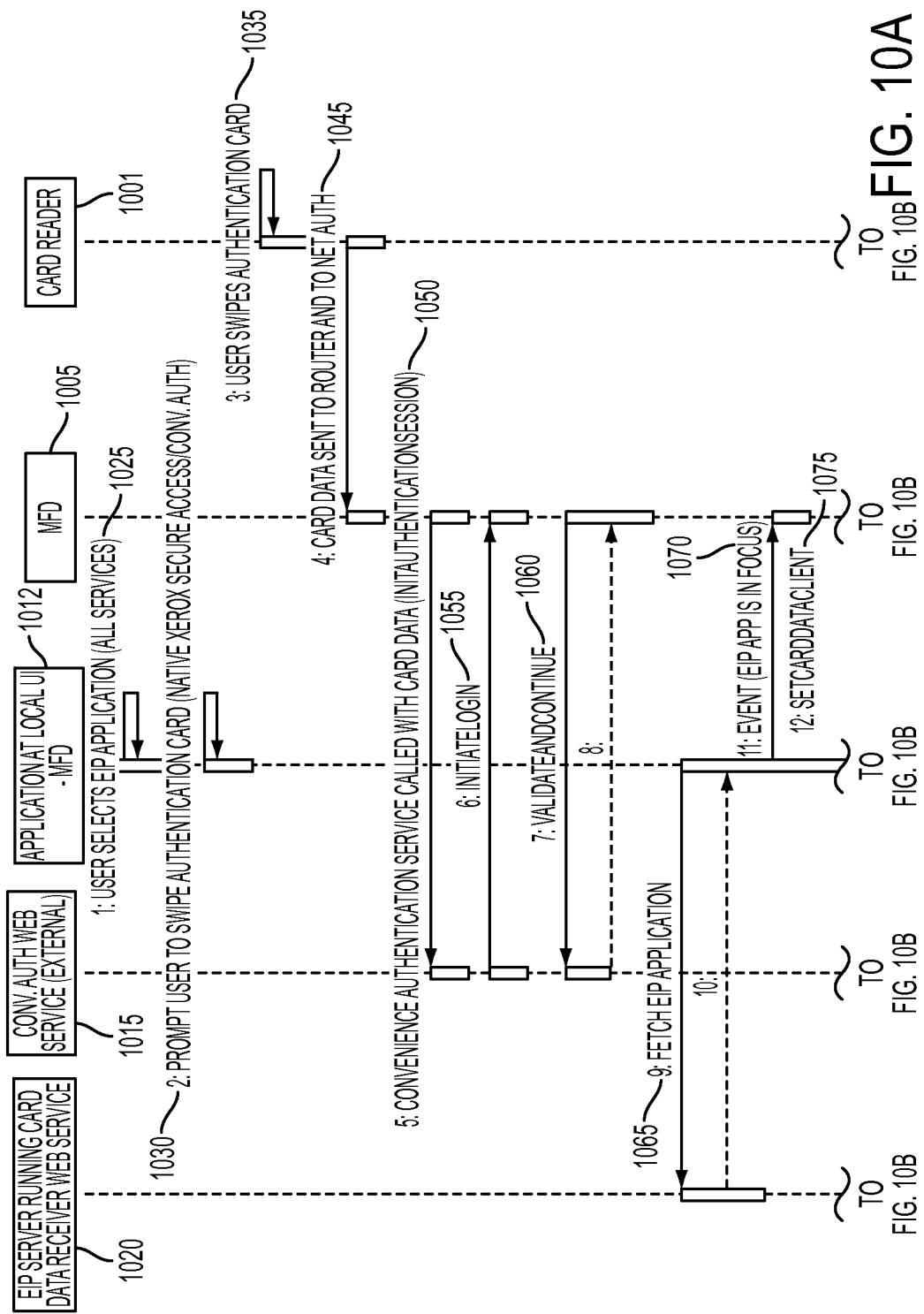

WEB SERVICE FOR ENABLING NETWORK ACCESS TO HARDWARE PERIPHERALS

FIELD

The embodiments disclosed herein relate generally to the field of peripheral hardware devices and more specifically to a software architecture, or web service, for enabling network access to peripheral devices interfaced with multi-function devices (MFD).

BACKGROUND

Multi-function devices (MFD), such as computers, laptops, printers, copiers, or other computing devices, typically have the necessary hardware, such as a LAN card, and software, such as a network operating system, to enable network accessibility. MFDs also typically have ports, such as USB ports, or interfaces, such as an RF or Bluetooth compatible interface, through which a peripheral, such as a card reader, keyboard, mouse, or display, can be locally connected. Unlike the MFDs, the peripheral devices are not typically network enabled, given the cost of the additional hardware and software, and therefore, are inaccessible over a network.

Attempts to make these peripheral devices network accessible require use of costly proprietary hardware and software. For example, current card reader solutions for MFD devices rely upon a third party vendor to supply a hardware device in which a card reader is attached. The hardware device typically requires its own power and network connections and the interface between the reader and the server validating the card data is proprietary and unique for each vendor.

Accordingly, there is need in the art for methods and systems to enable a peripheral device, which otherwise lacks intrinsic networking capabilities, to be accessible over a network once attached to a MFD. Additionally, there is a need in the art for a web service architecture which provides network access to peripherals attached to an MFD.

SUMMARY

The present specification discloses a computer readable medium storing an application for use in a system that is configured to interface with a network and configured to interface with a local peripheral device. The application comprises a first layer wherein the first layer communicates with the local peripheral device using a driver specific to the peripheral device and wherein the driver defines a plurality of functions which can be performed with the local peripheral device; a second layer wherein the second layer abstracts a subset of the plurality of functions and exposes the subset of the plurality of functions to a third layer; and the third layer wherein the third layer communicates over the network with a client and provides the client access to the subset of the plurality of functions through a plurality of calls.

Optionally, the calls conform to a web service protocol, such as SOAP. The first layer, second layer, and third layer are active upon initialization of said system. The local peripheral device is a card reader. The subset of the plurality of functions includes 1) a function of determining whether the card reader is plugged in or enabled, 2) a function of obtaining card reader information, such as type of card reader, card reader vendor, card reader identification, card reader model number, card reader manufacturer, card reader purpose, or connection type, 3) a function of setting a specific client authorized to receive, query, or obtain card data, 4) a function of removing a previously set client as the client authorized to receive, query, or otherwise obtain card data, or 5) a function of obtaining, receiving, or otherwise retrieving data read from the card reader, which may be transmitted in an XML format.

The present specification also discloses a computer readable medium storing an application for use in a system configured to interface with a network and configured to interface with a card reader. The application comprises: a first layer wherein the first layer communicates with the card reader using a driver specific to the card reader and wherein the driver defines a plurality of functions which can be performed with the card reader; a second layer wherein the second layer abstracts a subset of the plurality of functions and exposes the subset of the plurality of functions to a web service layer; and the web service layer wherein the web service layer communicates over the network with a client and provides the client access to the subset of the plurality of functions through a plurality of calls, each of the calls conforming to a web service protocol, such as SOAP.

The present specification also discloses a device adapted to interface with a network and adapted to interface with a card reader, said device having a computer readable medium storing an application, wherein said application is configured to provide a computing device access to a plurality of functions through a plurality of calls, wherein said subset of the plurality of functions includes at least one of i) a function of determining whether the card reader is plugged in or enabled, ii) a function of obtaining card reader information, iii) a function of setting a specific client authorized to receive, query, or obtain card data, iv) a function of removing a previously set client as the client authorized to receive, query, or otherwise obtain card data, or v) a function of obtaining, receiving, or otherwise retrieving data read from the card reader, and wherein said computing device remotely communicates with said device over said network.

Optionally, each of said calls conforms to a web service protocol, such as SOAP. Only one computing device is authorized to access to the plurality of functions at any one time. The computing device is authenticated before the application permits the computing device to have access to the function of obtaining card data. The card reader information includes at least one of a type of card reader, card reader vendor, card reader identification, card reader model number, card reader manufacturer, or connection type. If the card reader is not enabled or active, the function of obtaining card reader information returns a value indicative of no card reader being enabled or active when accessed by said computing device. The application can be activated or terminated any time after initialization of said device.

The present specification also discloses a method of enabling, in a first computing device configured to interface with a network and configured to interface with a local peripheral device, a second computing device to access at least one function of the local peripheral device via a network, wherein the local peripheral device is not independently accessible to the network. The method comprises the steps of communicating with the local peripheral device to define a plurality of functions which can be performed with the local peripheral device and exposing the plurality of functions to the second computing device via a communication protocol.

Optionally, the local peripheral device is a card reader, such as a swipe card reader, smart card reader, or proximity card reader. The plurality of functions includes a function of determining whether the card reader is plugged in or enabled. The plurality of functions includes a function of obtaining card reader information, such as a type of card reader, card reader vendor, card reader identification, card reader model number, card reader manufacturer, or connection type. The plurality of functions includes a function of setting a specific client authorized to receive, query, or obtain card data. The plurality of functions includes a function of removing a previously set client as the client authorized to receive, query, or otherwise obtain card data. The plurality of functions includes a function of obtaining, receiving, or otherwise retrieving data read from the card reader. The communication protocol comprises a plurality of calls conforming to a web service protocol, such as SOAP. The method further comprises the step of authenticating said second computing device and/or a user of the second computing device prior to exposing said plurality of functions to said second computing device.

These and other embodiments will be further described in the Detail Description and with reference to the Drawings, as itemized below.

BRIEF DESCRIPTION OF THE DRAWINGS

These and other features and advantages will be appreciated, as they become better understood by reference to the following detailed description when considered in connection with the accompanying drawings.

DETAILED DESCRIPTION

Various modifications to the preferred embodiment, disclosed herein, will be readily apparent to those of ordinary skill in the art and the disclosure set forth herein may be applicable to other embodiments and applications without departing from the spirit and scope of the present specification and the claims hereto appended. Thus, the present specification is not intended to be limited to the embodiments described, but is to be accorded the broadest scope consistent with the disclosure set forth herein.

Figure 1:
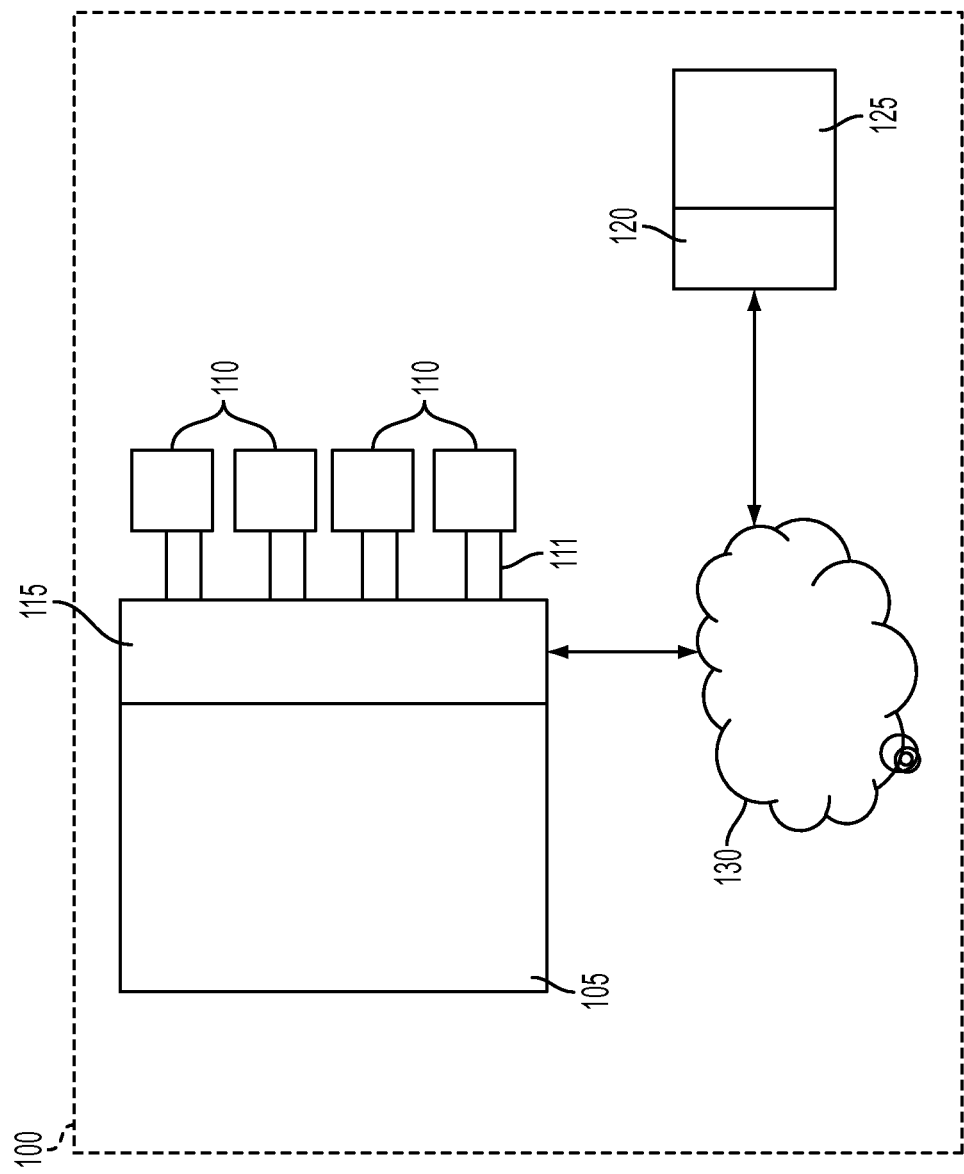
FIG. 1 is a block diagram of an embodiment of a system for enabling hardware peripheral devices to be accessible remotely over a network.

FIG. 1 shows a block diagram of an embodiment of a system 100 for enabling hardware peripheral devices to be accessible remotely over a network, such as the Internet. System 100 comprises a multi-function device 105 (hereinafter referred to as 'MFD') such as a computer, laptop, PDA, printer, digital copier, facsimile machine, bookmaking machine, or any other device known to persons of ordinary skill in the art that can be connected to a network and has the capability (by way of necessary hardware and software) to communicate and be communicable over the network. The MFD 105 interfaces with a plurality of hardware peripheral devices 110 using standard hardware interface 111, such as USB, thereby enabling "plug and play" functionality. Peripheral devices 110 comprise card readers, mass storage devices such as flash cards, keyboards, printers, mouse devices, or displays. The MFD 105 implements a hardware peripheral web services application 115 that enables the peripheral devices 110 to be accessible to a client application program 120 running on a remote server 125 over a network 130, such as the Internet.

Persons of ordinary skill in the art would appreciate that the network 130 is any public and/or private network configuration such as a LAN, WAN, MAN and can be wired and/or wireless. Persons of ordinary skill in the art would further appreciate that each of the peripheral devices 110 and the MFD 105 comprise at least one processor capable of executing programmatic instructions and a memory capable of storing data and responding to requests to retrieve or store data. Further, the application 115 comprises a plurality of programmatic instructions, stored on the memory of the MFD and executed by at least one processor in the MFD, which perform certain of the functions and features described herein.

It may be noted that the word "client" or "computing device" as used herein encompasses any apparatus, such as a digital copier, bookmaking machine, facsimile machine, multi-function machine, computer, laptop, PDA, printer, which performs a computing function for any purpose. It should further be noted that the term processor, as used herein, can comprise software, hardware, or a combination thereof functioning for a predetermined purpose, whereby one processor can operate substantially independently of another processor. Multiple processors can operate on separate or common chips, boards, devices, etc. Furthermore, the term call, as used herein, can include any step, process, programmatic instruction, or other method or structure of invoking a programmatic function. A function is any set of programmatic instructions that, when invoked, perform some action.

Figure 2:
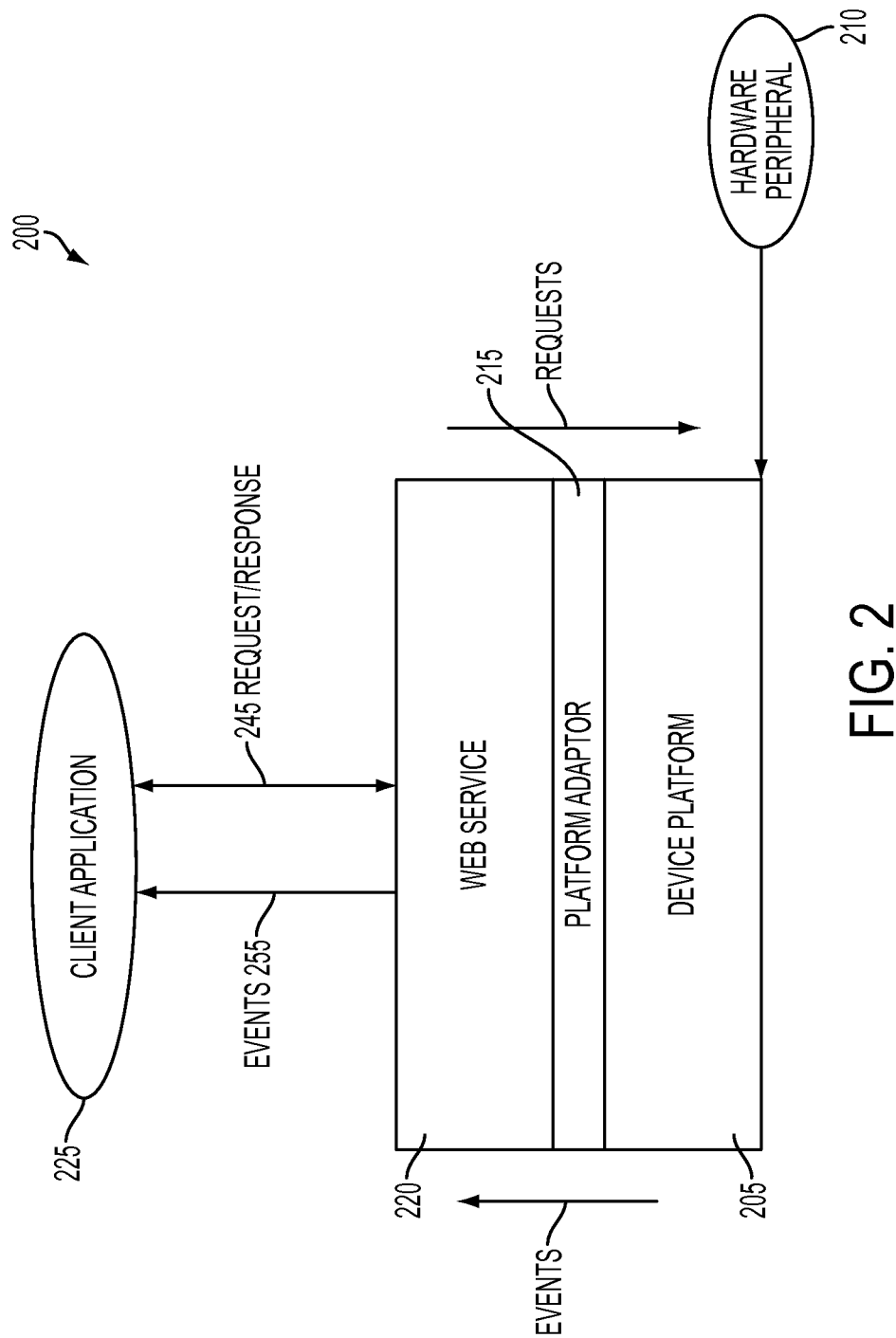
FIG. 2 is a block diagram depicting a high level view of the hardware peripherals web service architecture in accordance with one embodiment.

FIG. 2 is a block diagram depicting a high level view of the architecture of the hardware peripherals web service application 200. In one embodiment, the web service architecture 200 is implemented on a multi-function device (MFD) in the form of a plurality of application layers 205, 215, 220. At the lowest application level, the application 200 comprises a device platform layer 205 which comprises the operating system and driver framework capable of interacting with the specific hardware peripheral 210 attached to the MFD on which the application 200 is executing.

The device platform layer 205 interacts with the hardware peripheral 210 by, in one embodiment, interfacing through a standard USB hardware interface. More specifically, on connecting the peripheral device 210 to the MFD, the device platform layer 205 interfaces with and manages the peripheral device using the necessary peripheral driver which is unique to each type of peripheral. The Device Platform in turn provides the interface between the Platform Adapter layer 215 and the Hardware Peripheral. It should be appreciated that, in accordance with a standard USB implementation, the MFD comprises, or obtains, a driver for the USB device, loads the driver, and actively interfaces with the USB device in accordance with the driver software The platform adapter layer 215 abstracts the lower level hardware methods, processes, and functions into a higher level of functionality thereby serving to decouple the web service layer 220 from the device platform 205. The adapter layer 215 therefore has the ability to abstract peripheral driver functions, which are implemented on each platform differently and are therefore dependent on the underlying platform layer 205, and make those abstracted functions universally available to remote devices via the web service layer 220. More specifically, the hardware peripheral 210, such as a card reader, has numerous low level functions which serve to enable the peripheral to operate with a MFD. In accordance with an aspect of the layered web service architecture 200, these low level functions and configuration continue to be handled by the MFD operating system and driver software at the device platform layer 205, while the high level functions of the peripheral 210, as further described below, are exposed to the web service layer 220. This enables the web service layer 220 to be portable and uncoupled from the underlying device platform 205.

The web service layer 220 comprises a plurality of Application Programming Interfaces (APIs) that can be accessed over a network, such as the Internet, and executed on the MFD hosting the requested services. In one embodiment, the web service layer 220 comprises web APIs that enable an application program residing on a remote server to make web service based calls to the peripheral device attached to the MFD. In another embodiment, the application program residing on a remote server receives web service based calls from the MFD in accordance with user-based interactions with the attached peripheral device. In both embodiments, the web based calls/communication happen over the Hypertext Transfer Protocol (HTTP) protocol using Extensible Markup Language (XML) messages that follow the Simple Object Access Protocol (SOAP) standard and updates, future versions, or derivations thereof. In one embodiment, a Web Service Description Language (WSDL) is used to describe at least one web service and the methodology of accessing the web service and generate the appropriate functions for handling SOAP messaging.

The web service layer 220 APIs provide an interface to an application program 225 which wishes to transmits data and/or commands and/or receive data and/or commands from the hardware peripheral 210, thereby making use of the functionality of the peripheral 210 as if the hardware peripheral 210 was independently network accessible. In one embodiment the client application program 225 resides on a remote server interfacing with the web service layer 220 over a network, such as the Internet or an enterprise Intranet. In alternate embodiments the client application program 225 resides locally on the MFD that hosts the hardware peripherals web service software architecture 200.

As shown in FIG. 2, the client application program 225 sends requests to and receives responses 245 from the web service layer 220. To service the requests and provide the responses 245, the web service layer 220 uses the abstracted functionality exposed and made available by the platform adaptor layer 215. Through the abstracted functionality, as further described below, the web service layer can submit the requests and receive the responses via the device platform 210. Similarly, events 255 pertaining to the peripheral device 210 are communicated to the web service layer 220 by the underlying layers 215, 205. The web service layer 220 then communicates these events to the client application program 225.

The ability to abstract core peripheral device functionality and make such functionality universally available to third party applications eliminates the need to upgrade, update, or modify remote client applications every time the MFD or peripheral device has been updated, upgraded, or otherwise modified. Therefore, remote client applications remain compatible with peripherals as they change. Moreover, by abstracting higher level peripheral functionality, the complexity of the raw hardware interface, or the lowest hardware configuration level, continues to be handled by dedicated drivers and is not managed or otherwise addressed by the web service interface, thereby making the interfacing process generally, and each web service in particular, scalable, simple, extensible, portable, and platform independent.

In one embodiment, a web server or client (shown as element 302 in FIG. 3) executes remotely from the client application program 225 and is in data communication with the web service layer 220. The web server 302 comprises a GUI (Graphical User Interface) to enable a System Administrator to configure an IP address or hostname of the server on which the client application program 225 resides, along with a port number to be used for all server/MFD communication. This preconfigured address ensures the security of the peripheral data and ensures that such data and communications are only sent to a known and expected entity.

In another embodiment, the web service API specific to enabling the security of the peripheral data is only accessible via a GUI local to the MFD. In this embodiment, a client (shown as element 302 in FIG. 3) executes locally and is in data communication with the web service layer 220. The local client 302 comprises a GUI (Graphical User Interface) to enable a System Administrator to configure an IP address or hostname of the server on which the program 225 resides, along with a port number to be used for all server/MFD communication. This preconfigured address ensures the security of the peripheral data and ensures that such data and communications are only sent to a known and expected entity. It should be appreciated that, in one embodiment, both a remote client and local client can be implemented concurrently.

Embodiments of the abstracted functionality, particular to a card reader peripheral device, such as a swipe card reader, proximity card reader, or smart card reader, will now be described. It should be appreciated that, in these embodiments, the card reader functions as the hardware peripheral, which is connected to a networked MFD that is in local or remote data communication with one or more computing devices. The computing devices are issuing requests, receiving responses, and receiving event data from the card reader through the hardware peripheral web service application executing on the MFD. It should further be appreciated that, in one embodiment, the described web services methods are the only methods made available for a peripheral card reader, thereby providing the requisite methods to enable meaningful functionality but not so many methods as to be excessively specific and difficult to implement. In another embodiment, additional methods are made available for a peripheral card reader to enable access to other card reader functions.

In one embodiment, the platform adaptor 215 abstracts a method, process, or function of determining whether the card reader is plugged in and/or enabled. Here, the client application 225 wishes to query whether the hardware peripheral device 210, e.g. the card reader, is plugged into the MFD or not. The hardware peripherals web service application abstracts into the platform adaptor 215 the requisite functionality from the device platform 215 and exposes that functionality to the web service layer 220. More specifically, in one embodiment, the platform adaptor 215 abstracts from the device platform 215 a HardwarePeripheralsEnabled method and exposes that method to the web service layer 220. By implementing this method, a remote client application can determine if a card reader, connected to a network MFD, is enabled and therefore ready for use or, alternatively, if the card reader is disabled and therefore unable to be used or no longer available for use.

In one embodiment, the platform adaptor 215 abstracts a method, process, or function of obtaining certain card reader information, such as the type of card reader, peripheral id, peripheral name, card reader vendor id, card reader product identification, card reader manufacturer, connection type or other card reader specifications. This method returns an empty sequence if no card reader is available, which could be used as a method to detect for the existence of a card reader.

Here, the client application 225 wishes to query the hardware peripheral device 210, e.g. the card reader, to obtain information on certain of its specifications, such as type, vendor, manufacturer, purpose, connection type, identification, model number, or other specifications. The hardware peripherals web service application abstracts into the platform adaptor 215 the requisite functionality from the device platform 215 and exposes that functionality to the web service layer 220. More specifically, in one embodiment, the platform adaptor 215 abstracts from the device platform 215 a GetHardwarePeripheralsInfo method and exposes that method to the web service layer 220. By implementing this method, a remote client application can obtain specifications regarding the card reader connected to a network MFD.

Figure 5:
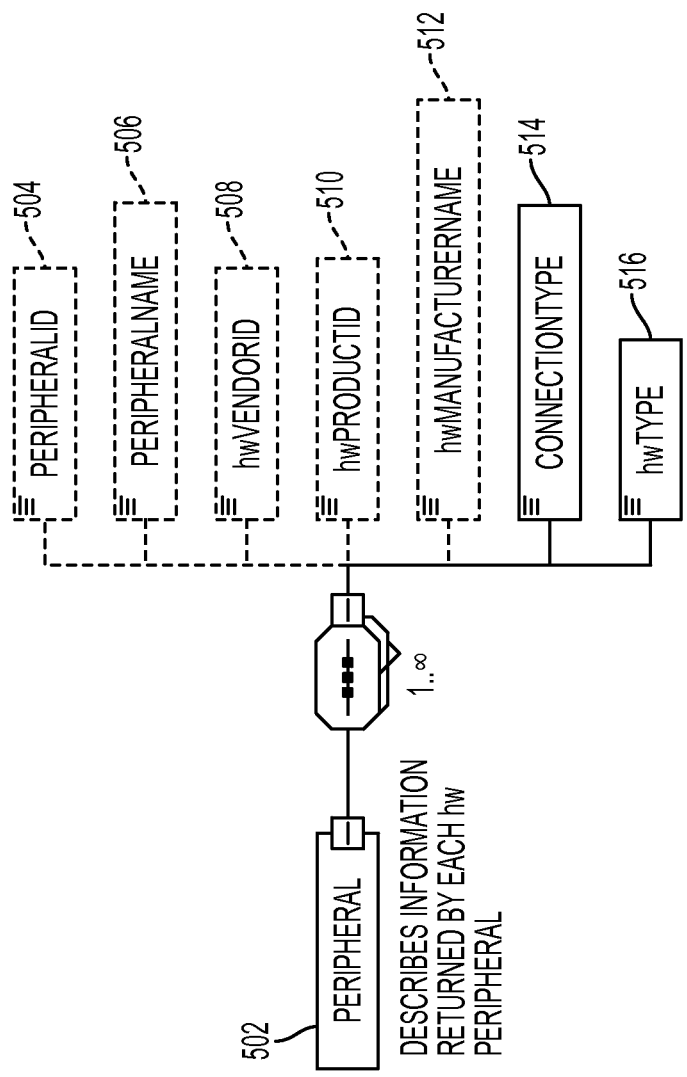
FIG. 5 is a block diagram showing an exemplary set of data returned by an exemplary method made available via a web service.

Referring to FIG. 5, a GetHardwarePeripheralsInfo method 502 is exposed to the web service layer and, upon being accessed or executed by a remote client, retrieves a plurality of information, including an identifier of the peripheral device 504, a name of the peripheral device 506, a vendor identifier of the peripheral device 508, a product identifier of the peripheral device 510, a manufacturer identifier of the peripheral device 512, a descriptor of the type of connection used by the peripheral device 514 (such as USB, parallel port, FDI pin connected, Bluetooth, Ethernet connected, network, or others), a descriptor of the type of the peripheral device 516 (such as keyboard, mouse, audio device, smart card reader, proximity card reader, swipe card reader, video device, wireless controller, mass storage device or others).

In another embodiment, instead of implementing the HardwarePeripheralsEnabled method, the GetHardwarePeripheralsInfo method is designed to return nothing if a peripheral is not installed, thereby providing enablement or disablement information without requiring accessing or executing an additional, or separate, method. In one embodiment, once a web services method determines if a peripheral is available or not, e.g. via the GetHardwarePeripheralsInfo or HardwarePeripheralsEnabled methods, the other web services are initiated or activated. In another embodiment, other web services methods are initiated or activated regardless of what result is returned by the execution of a method which determines if a peripheral is available or not, such as the GetHardwarePeripheralsInfo method or HardwarePeripheralsEnabled method.

It should further be appreciated that an embodiment of the disclosed web services system can operate without a separate peripheral device discovery mechanism because the enabled web services methods, which are automatically loaded upon initiation, start up, or boot of the MFD, are automatically configured to return the requisite device information, which would otherwise be obtained through a separate discovery mechanism, or a default of "nothing", "false", "disabled", or any other negative indicator if a peripheral device is not connected or enabled.

Figure 7:
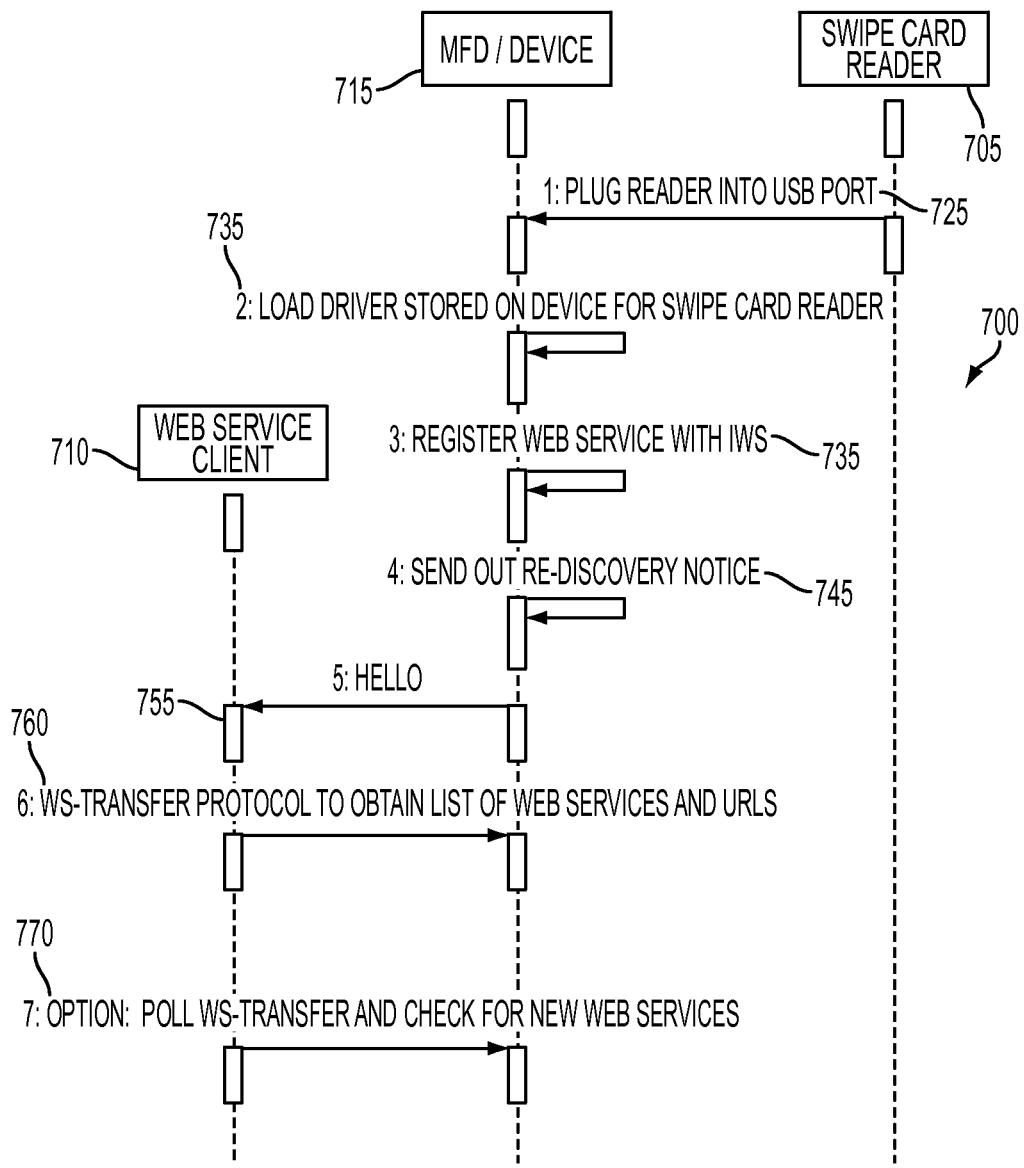
FIG. 7 is an exemplary sequence diagram that shows how card reader may be discovered by a client in one embodiment.

In another embodiment, a separate device discovery mechanism is implemented. Referring to FIG. 7, a device discovery process 700 is shown. A card reader, such as a swipe card reader, 705, is plugged into a USB port 725 of a MFD device 715. Upon recognizing that a device has been plugged into the USB port, the MFD device 715 loads a driver 735 specific to the card reader 705. The MFD 715 registers the associated web services with a gateway or other server 735. The MFD 715 generates a rediscovery notice 745, which causes a discovery query to be transmitted 755 to a client application 710. The client application 710, in turn implements a protocol to obtain a list of available web services and associated addressing information. Alternatively, the client application 710 may independently, and without prompting from the MFD 715, implement a protocol to obtain a list of available web services and associated addressing information 770.

In another embodiment, the platform adaptor 215 abstracts a method, process, or function of setting a specific client application that is authorized to receive, query, or otherwise obtain card data. Here, the client application 225 wishes to set a specific client application as being the sole application, or one of a preselected number of applications, authorized to query and receive card data. The hardware peripherals web service application abstracts into the platform adaptor 215 the requisite functionality from the device platform 215 and exposes that functionality to the web service layer 220.

More specifically, in one embodiment, the platform adaptor 215 abstracts from the device platform 215 a SetCardDataClient method and exposes that method to the web service layer 220. In one embodiment, the SetCardDataClient method is effectuated by a function which passes an address of the client application, such as a URL. By implementing this method, a remote client application can set itself, or some other client, as the designated client authorized to obtain card reader data. It should be appreciated that, in one embodiment, only one client can be set as the designated client authorized to obtain card reader data.

Figure 8:
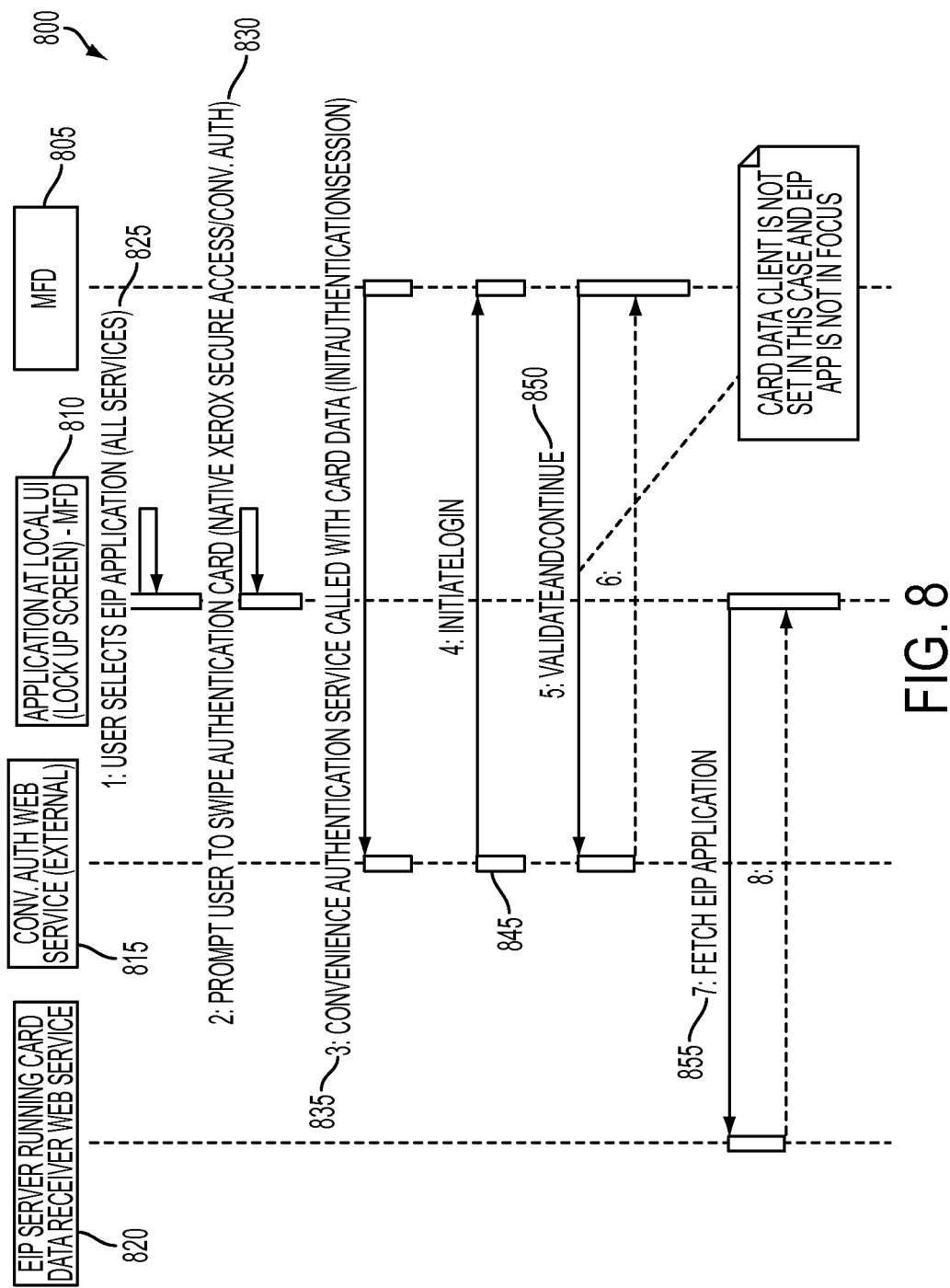
FIG. 8 is an exemplary sequence diagram that shows how a user may be authenticated in one embodiment.

It should be appreciated that one or more security processes can be implemented with, integrated with, or executed concurrently to the web services described herein. Referring to FIG. 8, in one embodiment, an application, having a user interface, 810 executes locally at a MFD 805. A user selects, designates, or otherwise sets 825 a client application, such as a program executing remotely on a server 820. The client application may be set at the local UI 810 or remotely via the SetCardDataClient method. In one embodiment, the client application may only be set at the local UI 810 of the MFD 805. A user is prompted to then locally swipe an authentication card 830 which comprises security data required to authenticate a user. Security data is obtained by the local application 810 and communicated to 835 an authentication server 815 that serves to validate, authenticate, or otherwise approve of the user. The authentication server and local application engage in a log-in 845 and validation process 850 to authenticate the user. Upon final validation of the user, the remote application is finally called, set, fetched, or otherwise established as being authorized 855 to receive card data.

In another embodiment, the platform adaptor 215 abstracts a method, process, or function of removing a previously set client application as the client authorized to receive, query, or otherwise obtain card data. Here, the client application 225 wishes to remove itself as the sole application, or one of a preselected number of applications, authorized to query and receive card data. The hardware peripherals web service application abstracts into the platform adaptor 215 the requisite functionality from the device platform 215 and exposes that functionality to the web service layer 220.

More specifically, in one embodiment, the platform adaptor 215 abstracts from the device platform 215 a ClearCardDataClient method and exposes that method to the web service layer 220. In one embodiment, the ClearCardDataClient method is effectuated by a function which passes an address of the client application, such as a URL. By implementing this method, a remote client application can remove itself, or some other client, as the designated client authorized to obtain card reader data.

In another embodiment, the platform adaptor 215 abstracts a method, process, or function of obtaining, receiving, or otherwise retrieving data read from the card reader. Here, the client application 225 receives, as an event transmission, data from the card reader when the data is read. The hardware peripherals web service application abstracts into the platform adaptor 215 the requisite functionality from the device platform 215 and exposes that functionality to the web service layer 220.

More specifically, in one embodiment, the platform adaptor 215 abstracts from the device platform 205 a SendCardData method, which is called to send card data to the client application via the web service layer 220. In one embodiment, the SendCardData method is effectuated by a function which passes a string containing an XML document having information about the card data and the card data itself. By implementing this method, a remote client application can obtain or receive data read from a card reader.

Figure 6:
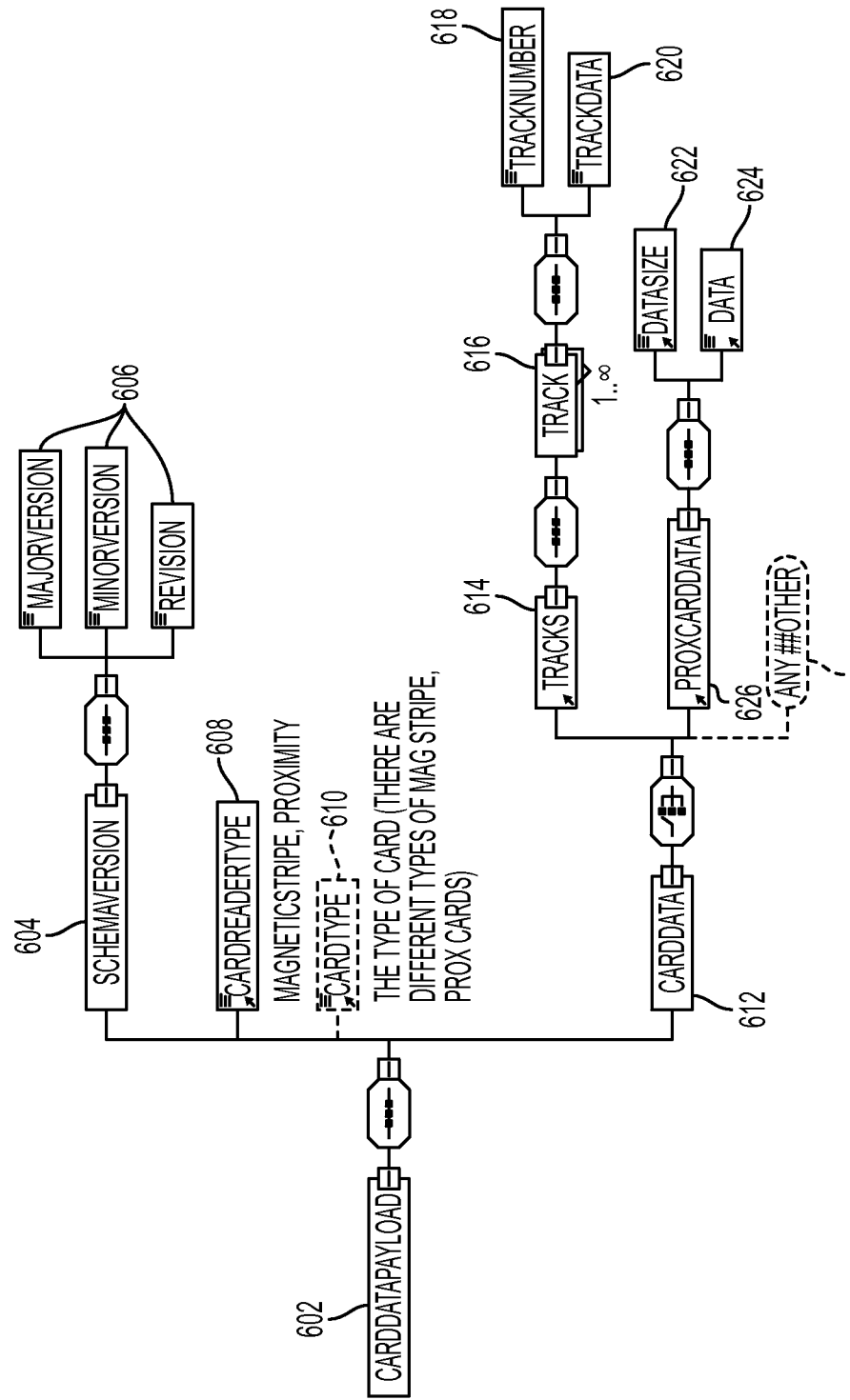
FIG. 6 is a block diagram showing another exemplary set of data returned by another exemplary method made available via a web service.

In one exemplary embodiment, the platform adaptor 215 abstracts a method, process, or function of obtaining, receiving, or otherwise retrieving data about the user at the local UI of the MFD. Here, the client application 225 receives, as an event transmission, an XML document containing certain information about the card reader. Referring to FIG. 6, a the platform adaptor abstracts from the device platform a CardDataPayload 602 method, which is called to send card data to the client application via the web service layer. In one embodiment, the CardDataPayload 602 method, when effectuated, returns a) schema version data 604, which contains information regarding the version of the schema used to create the card deader data, such as a major version, minor version, or revision 606, b) card reader type data 608, c) card type data 610, and d) card data 612, including general track data 614, specific track data 616, track number 618, and actual track data 620, proximity card data 626, data size (size of the data in bytes) 622, and data 624, and any other information 628.

Similar to the security authentication processes discussed above, in one embodiment, the card data returned is also used to authenticate the card user through, for example, subjecting certain of the returned card data to a second set of APIs configured to validate the returned card data against data in a database, such as a customer database, a valid user database, an authenticated user database, or other data source. In one embodiment, card data is returned to the client application program in an XML document that, for example, contains data as described above. The use of XML format allows the hardware peripherals web service to return various card reader data that vary in size and yet provide the client application program with a universal framework for parsing that data.

Also, in one embodiment, to ensure data security, the SendCardData method requires the use of SSL (Secure Socket Layer) and therefore is only available to be called from HTTPs ports configured on the MFD and server application. In alternate embodiments, other security protocols and encryption methods known to persons of ordinary skill in the art can be used without departing from the scope and spirit of the present disclosure. The purpose of implementing data security is to ensure all card reader data exchanged between a card reader and remote client is protected and not accessible to unauthorized parties. It should further be appreciated that, in one embodiment, the type of card reader data available, via the SendCardData method, will be dependent upon the nature of the remote application. Certain remote applications can be made ineligible to receive certain types of data, such as credit card, social security, health, or other highly confidential or personal data.

Additional security may be enabled by providing an audit or event log, located at the MFD, remote client, or other server, that receives event notifications every time a particular event occurs, such as the setting of client, the removal of a client, the reading of card data, the swiping of a card, or the attachment or enablement of a peripheral device. In one embodiment, actual card data is not logged, or made part of, the audit or event log.

In another embodiment, the platform adaptor 215 abstracts a method, process, or function of configuring a card reader LED, which indicates the status of the card reader or provides visual direction to the user regarding what actions the user should, or should not, take next. Here, the client application 225 receives, as an event transmission, data from the card reader regarding the state of the card reader, including whether the card reader is enabled, ready to read a card, or busy. The client application may also communicate, via this method, configuration data that will configure card reader displays or LED information in accordance with a user's preference, including setting an LED display to a particular color, designate certain LED functionality as being "solid" or "flashing", generating audible signals, or generating any visual parameters.

In one embodiment, the application 200 requires web services associated with a hardware peripheral device, such as the card reader, to start up at boot time of the MFD (that is the computer), even if the associated hardware peripheral is not connected to the MFD. This allows a system administrator, for example, to enable and disable a web service. Thus, the web service can be called regardless and generate a fault, such as a SOAP fault, if the associated hardware peripheral is not attached or enabled. In another embodiment, each of the web service 220, platform adaptor 215, and device platform 205 layers can be dynamically initiated, activated executed, actuated, shut down, or terminated after the MFD device is already booted and/or running.

Figure 3:
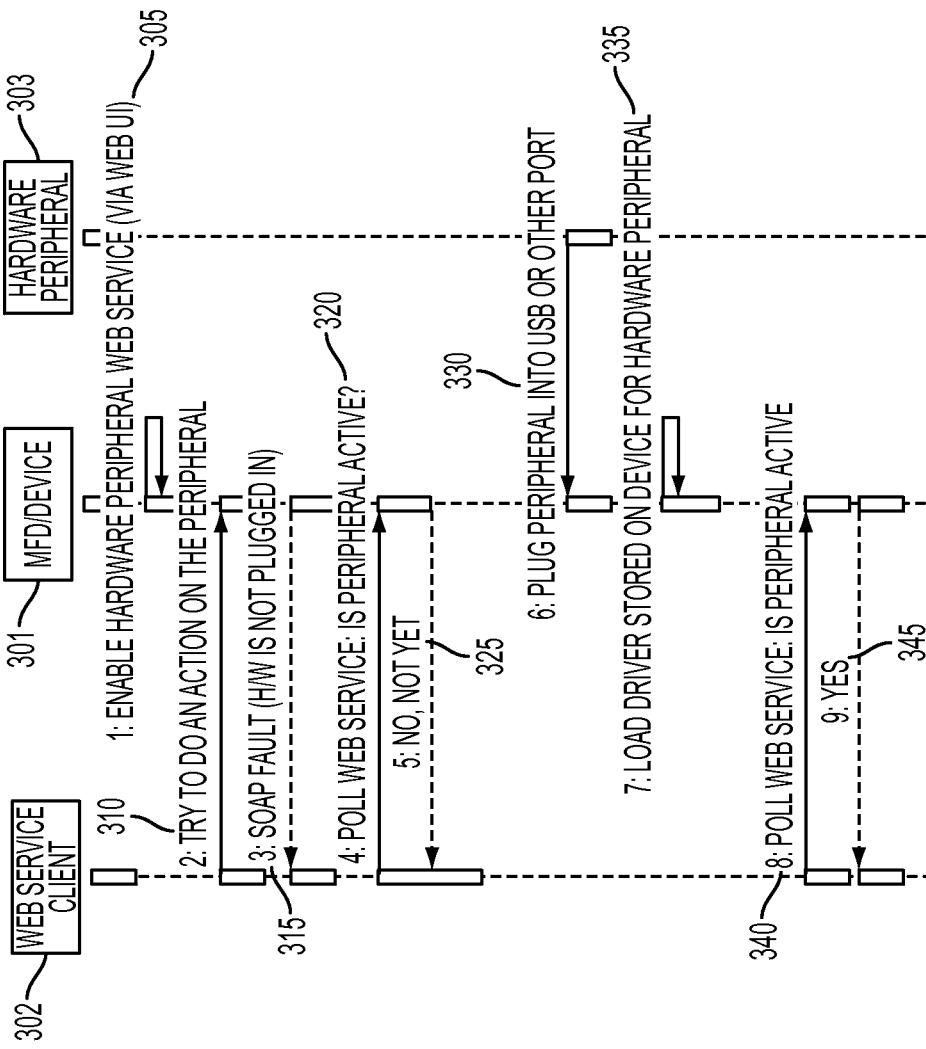
FIG. 3 is a sequence diagram that describes, according to one embodiment, event flows that occur when a program attempts to determine if a hardware peripheral, such as a card reader, is active/enabled.

FIG. 3 is a sequence diagram that describes, according to one embodiment, event flows that occur when a client application program attempts to determine if a hardware peripheral, such as a card reader, is active or enabled. At step 305 the hardware peripheral web service that resides on MFD 301, is enabled, such as during boot or initial start up of the MFD. At step 310 the client application program 302 residing, for example, on a remote server sends a query or action request to the web service at MFD 301 pertaining to the peripheral device 303. If the hardware peripheral device 303 is not plugged into the MFD 301, the web service returns a corresponding SOAP fault at step 315.

The client application program 302 can keep polling the web service at MFD 301, such as at step 320, to check if the peripheral device 303 is active yet. The polling can be programmed to be manual or automatic, occurring over a predefined time period and frequency. If the device 303 is not yet active, the web service conveys a message that the peripheral device 303 is not enabled, at step 325. At step 330 the peripheral device 303 is plugged into the MFD 301. As a result, at step 335, driver software associated with the peripheral device 303 and stored at the MFD 301 is loaded. The client application program 302 continues to poll the web service at MFD 301, such as again at step 340, to check if the peripheral device 303 is active. This time, the web service conveys an affirmative message at step 345, since the HardwarePeripheralsEnabled method is subject to a substantive response and not a default response.

Figure 4:
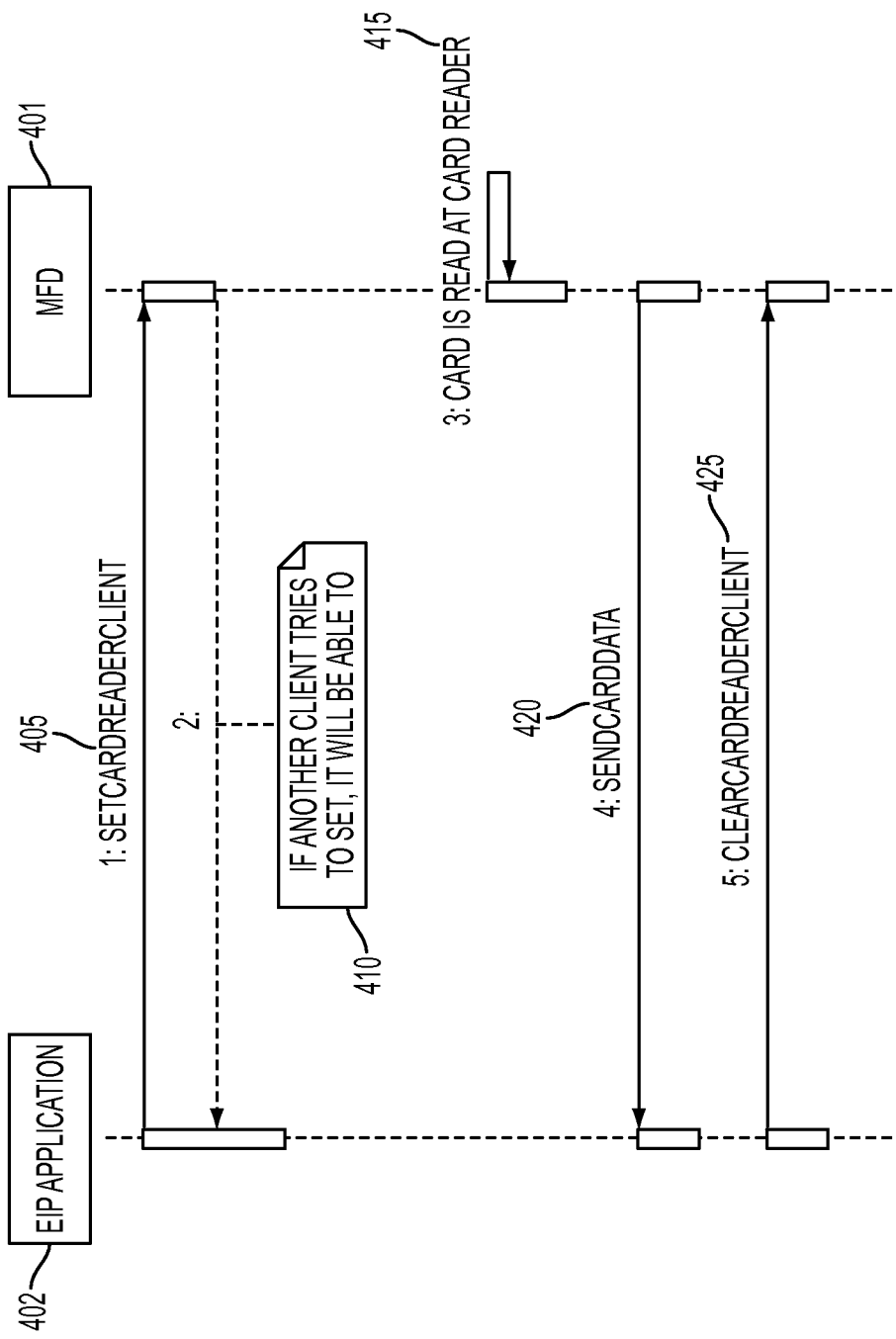
FIG. 4 is a sequence diagram that shows how card data is sent to a program and the events that occur during the process.

Persons of ordinary skill in the art would appreciate that card data is read by a card reader when a user swipes the card or puts the card close to the card reader in cases of swipe or proximity card readers, respectively. FIG. 4 is a sequence diagram that shows how the card data is sent to a client application program and the events that occur during the process. The client application program 402 that resides on a remote server is set or subscribed with the hardware peripheral web service running on a MFD 401, at step 405. This is done, for example, by invoking the SetCardDataClient method of the web service. In one embodiment, only one client application program is allowed to be set at a time, per card read, to receive card data. In another embodiment, if another client application tries to set, it is allowed to 410.

Once the card is read at the card reader (hardware peripheral device) at step 415, the web service at MFD 401 communicates the read card data to the client application program 402. This is done, for example, by invoking the SendCardData method of the web service at step 420. In one embodiment, the card data is sent in XML format. When the card data is read, the data is sent to only the client application program that was set corresponding to that read event. Thereafter, at step 425, the currently set client application program is cleared by invoking the ClearCardDataClient method of the web service. In one embodiment, the card data client application can be reset during a system timeout or at a clear all event.

It should be appreciated that, in one embodiment, the web services processes provide for a plurality of faults to be issued or effectuated upon the occurrence of certain events, such as a remote client attempting to access a web service operation which is only allowed at the local UI or host, an invalid, or non-SSL, remote server address was passed to the local UI, a peripheral device is no longer connected or enabled, a method was called that is not supported by the device, or any other invalid argument or parameter was passed. Faults may be communicated to a user, either via the local UI at the MFD or at the remote application, through any form of messaging, including instant messaging or a browser display.

Figure 9A:
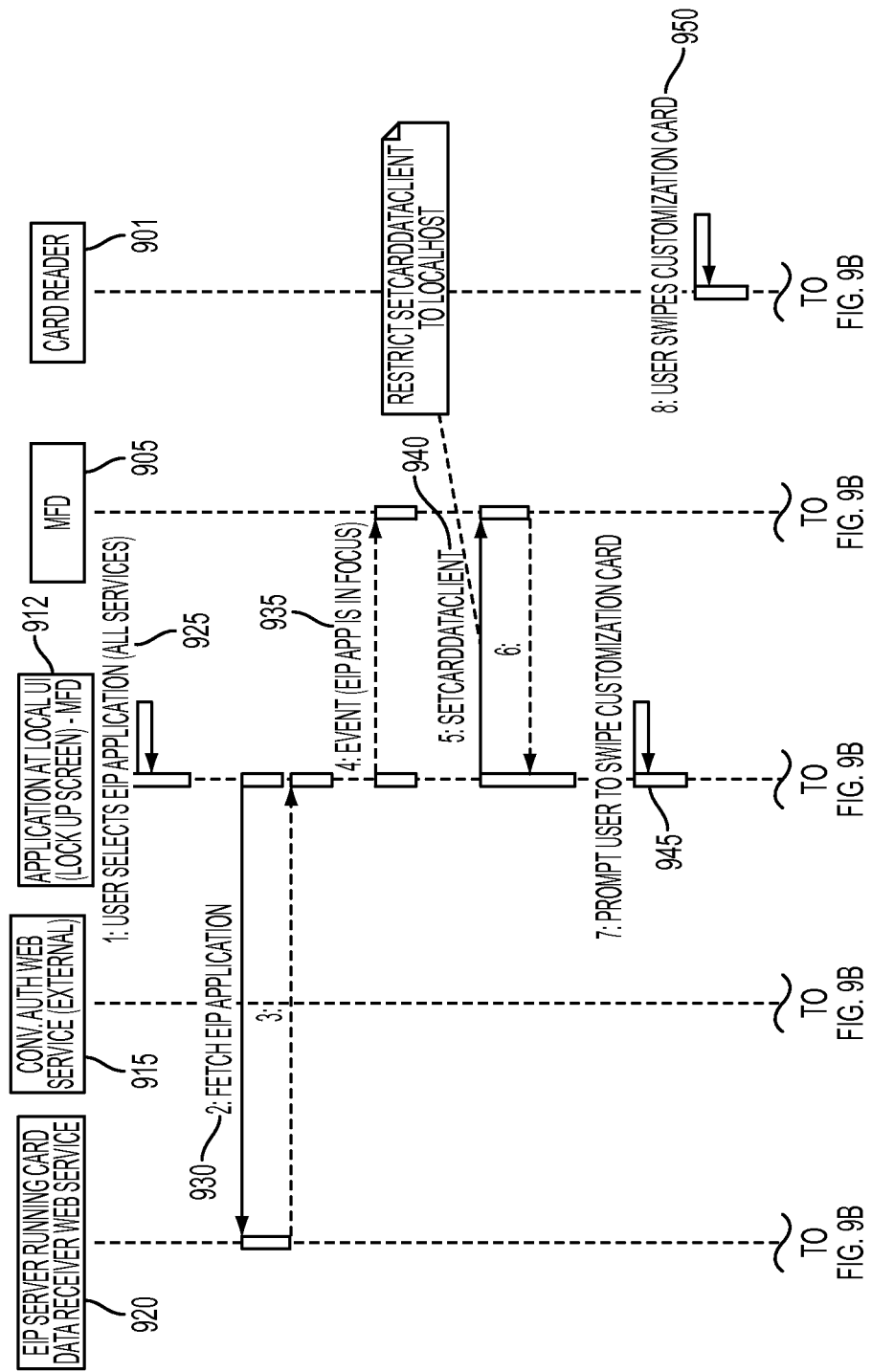
FIG. 9 is a sequence diagram that shows how a remote client may access card reader data in one embodiment.
Figure 9B:
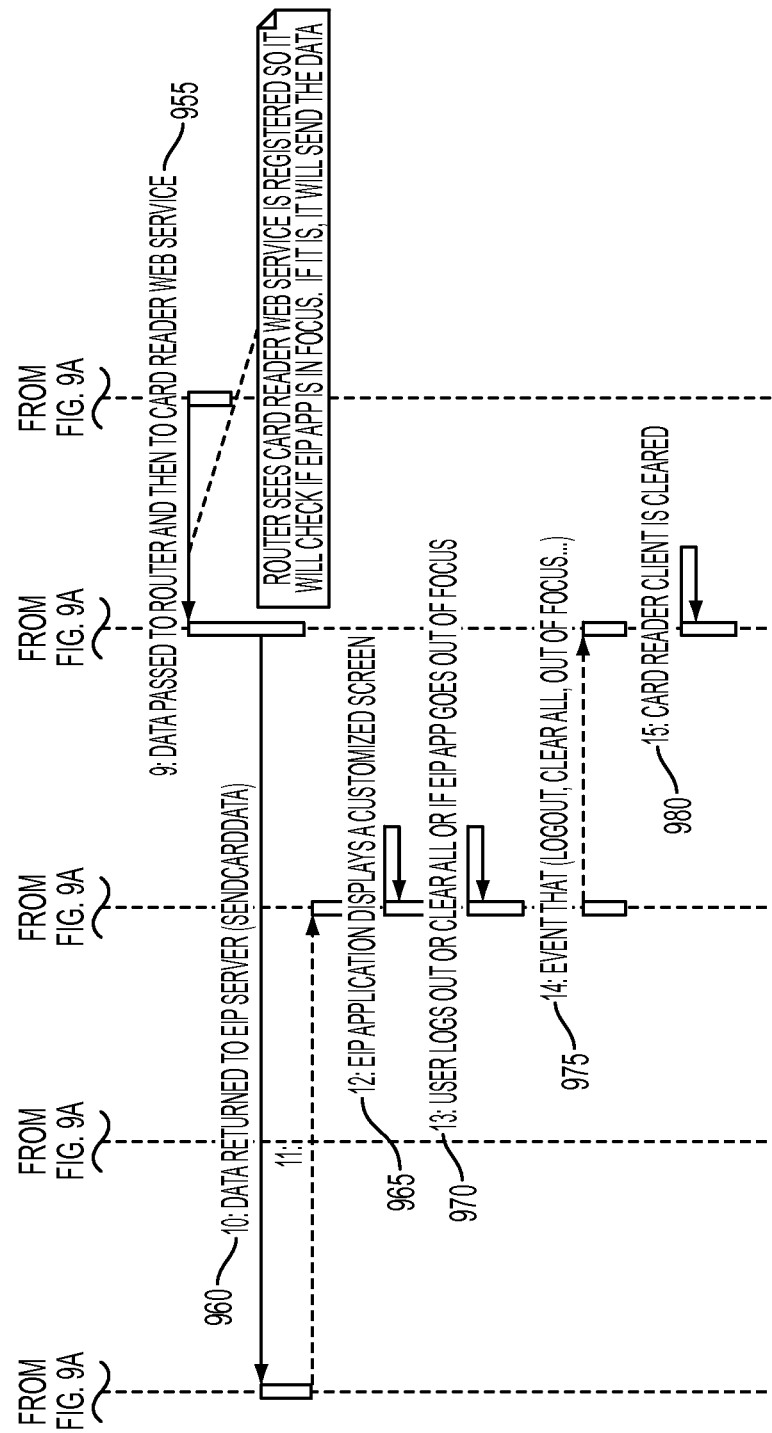

Referring to FIG. 9, in another embodiment, an application, having a user interface, 912 executes locally at a MFD 905. A user selects, designates, or otherwise selects or sets 925 a client application, such as a program executing remotely on a server 920. The client application may be set at the local UI 912. In one embodiment, the client application may only be set at the local UI 912 of the MFD 905, which is in data communication with a card reader 901 that is local thereto and not independently networked or network accessible.

After a user selects or sets 925 a client application, the local application 912 fetches and receives 930 data or programmatic instructions from the client application executing remotely on a server 920. With the client application selected and in focus 935, a card data client is set via the SetCardDataClient method 940. A user is then prompted to swipe a customization card 945 which comprises personalization, security, or other custom data specific to a user. After the user swipes the customization card 950, data from the card reader 901 is passed 955 to the MFD 905. With the client application selected and in focus, data is sent to the remote server 920 via the SendCardData method 960. The local UI 912 displays a screen customized 965 to the client application. Once the user completes his or her actions and logs out or otherwise causes the remote client application to no longer be set 970 at the local UI 912, the client application is removed, cleared, or taken out of focus 975 from the local UI 912 and the card reader client is reset 980.

Figure 10B:
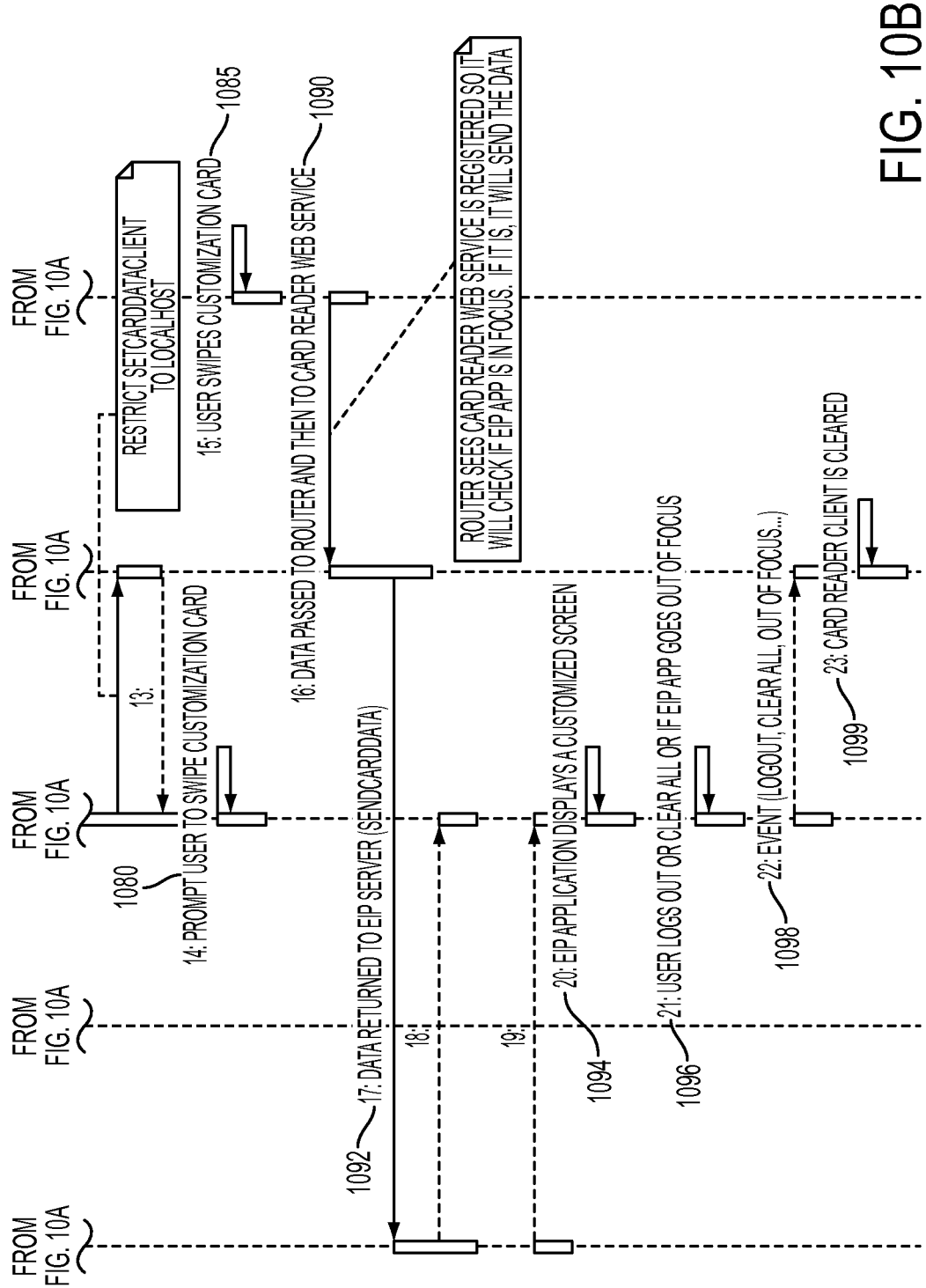
FIG. 10 is a sequence diagram that shows how a remote client may be authenticated and access card reader data in one embodiment.

Referring to FIG. 10, in another embodiment, an application, having a user interface, 1012 executes locally at a MFD 1005, which is in data communication with a card reader 1001 that is local thereto and not independently networked or network accessible. A user selects, designates, or otherwise sets 1025 a client application, such as a program executing remotely on a server 1020. The client application may be set at the local UI 1012 or remotely via the SetCardDataClient method. In one embodiment, the client application can only be set at the local UI 1012 of the MFD 1005. A user is prompted to then locally swipe an authentication card 1030 which comprises security data required to authenticate a user. The user swipes 1035 the authentication card at the card reader 1001. Security data is obtained 1045 by the local application 1012 at the MFD 1005 and communicated 1055 to an authentication server 1015 that serves to validate, authenticate, or otherwise approve the user. The authentication server and local application engage in a log-in 1055 and validation process 1060 to authenticate the user. Upon final validation of the user, the remote application is finally called, set, fetched, or otherwise established 1065, 1070 as being authorized to receive card data.

With the client application selected and in focus 1065, 1070, a card data client is set via the SetCardDataClient method 1075. A user is then prompted to swipe a customization card 1080 which comprises personalization, security, or other custom data specific to a user. After the user swipes the customization card 1085, data from the card reader 1001 is passed 1090 to the MFD 1005. With the client application selected and in focus, data is sent to the remote server 1020 via the SendCardData method 1092. The local UI 1012 displays a screen customized 1094 to the client application. Once the user completes his or her actions and then logs out or otherwise causes the remote client application to no longer be set 1096 at the local UI 1012, the client application is removed, cleared, or taken out of focus 1098 from the local UI 1012 and the card reader client is reset 1099.

It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. In a first computing device configured to interface with a network and configured to interface with a local peripheral device using a driver specific to said local peripheral device, a method of enabling a second computing device to access, and control, via said network, at least one function of said local peripheral device, wherein said local peripheral device is not independently accessible to said network, comprising the steps of:

Communicating with said local peripheral device, using the driver specific to said local peripheral device, to define a plurality of functions which can be performed with said local peripheral device;

Locally storing a list of said plurality of functions;

Abstracting each of said plurality of functions into an abstracted representation of the function, wherein said abstracted representation of the function conforms to a standard format, is descriptive of one of said plurality of functions, and enables usage of one of said plurality of functions independent of the driver specific to said local peripheral device;

Transmitting said abstracted representations of the functions to said second computing device via a communication protocol;

Receiving a first transaction from said second computing device, wherein said first transaction is communicated using at least one of said abstracted representations of the functions; and Communicating said first transaction to said local peripheral device, wherein said first transaction causes the local peripheral device to implement at least one of said plurality of functions.

2. The method of claim 1 wherein said local peripheral device is a card reader.

3. The method of claim 2 wherein said card reader is at least one of a swipe card reader, smart card reader, or proximity card reader.

4. The method of claim 2 wherein said plurality of functions includes a function of determining whether the card reader is plugged in or enabled.

5. The method of claim 2 wherein said plurality of functions includes a function of obtaining card reader information.

6. The method of claim 5 wherein said card reader information includes at least one of: type of card reader, card reader vendor, card reader identification, card reader model number, card reader manufacturer, or connection type.

7. The method of claim 2 wherein said plurality of functions includes a function of setting a specific client authorized to receive, query, or obtain card data.

8. The method of claim 2 wherein said plurality of functions includes a function of removing a previously set client as the client authorized to receive, query, or otherwise obtain card data.

9. The method of claim 2 wherein said plurality of functions includes a function of obtaining, receiving, or otherwise retrieving data read from the card reader.

10. The method of claim 1 wherein said communication protocol comprises a plurality of calls conforming to a web service protocol.

11. The method of claim 10 wherein the web service protocol comprises SOAP.

12. The method of claim 1 further comprising the step of authenticating said second computing device prior to exposing said plurality of functions to said second computing device.

13. A device adapted to interface with a network and adapted to interface with a card reader, using a driver specific to said card reader, said device having a computer readable medium storing an application, wherein said application is configured to communicate with the card reader, using the driver specific to said card reader, to define a plurality of functions which can be performed with said card reader, locally store a list of said plurality of functions, abstract each of said plurality of functions into an abstracted representation of the function, wherein said abstracted representation of the function conforms to a standard format, is descriptive of one of said plurality of functions, and enables usage of one of said plurality of functions independent of the driver specific to said card reader, transmit the abstracted representations of the functions to a second computing device via a communication protocol; receive a first transaction from said second computing device wherein said first transaction is communicated using at least one of the abstracted representation of the functions, and communicate said first transaction to said card reader, wherein said first transaction causes the card reader to implement at least one of said plurality of functions through a plurality of calls, wherein said plurality of functions includes at least one of i) a function of determining whether the card reader is plugged in or enabled, ii) a function of obtaining card reader information, iii) a function of setting a specific client authorized to receive, query, or obtain card data, iv) a function of removing a previously set client as the client authorized to receive, query, or otherwise obtain card data, or v) a function of obtaining, receiving, or otherwise retrieving data read from the card reader, and wherein said computing device remotely communicates with said device over said network.

14. The device of claim 13 wherein each of said calls conforms to a web service protocol.

15. The device of claim 14 wherein said web service protocol comprises SOAP.

16. The device of claim 13 wherein only one computing device is authorized to access to said plurality of functions at any one time.

17. The device of claim 13 wherein the computing device is authenticated before said application permits said computing device to have access to the function of obtaining card data.

18. The device of claim 13 wherein said card reader information includes at least one of a type of card reader, card reader vendor, card reader identification, card reader model number, card reader manufacturer, or connection type.

19. The device of claim 18 wherein, if said card reader is not enabled or active, said function of obtaining card reader information returns a value indicative of no card reader being enabled or active when accessed by said computing device.

20. The device of claim 13 wherein said application can be activated or terminated any time after initialization of said device.

* * * * *